(12) United States Patent  (10) Patent No.: US 8,059,108 B2
Carlson et al.  (45) Date of Patent: *Nov. 15, 2011

(54) DETERMINING THE LOCATION OF A STYLUS FOR A PORTABLE ELECTRONIC DEVICE

(75) Inventors: Michael P. Carlson, Austin, TX (US); Linda A. Lisle, Cedar Park, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 821 days.

This patent is subject to a terminal disclaimer.

(21) Appl. No.: 12/058,462

(22) Filed: Mar. 28, 2008

(65) Prior Publication Data

US 2008/0179113 A1  Jul. 31, 2008

Related U.S. Application Data

(63) Continuation of application No. 11/232,740, filed on Sep. 22, 2005, now Pat. No. 7,522,158.

(51) Int. Cl.
*G06F 3/033* (2006.01)
(52) U.S. Cl. ............ 345/179; 701/207; 342/465
(58) Field of Classification Search .......... 345/173–179; 710/1–74; 200/61.59; 340/500, 529, 540, 340/568.1, 571, 686.4; 726/3; 701/207; 342/450, 463, 465

See application file for complete search history.

(56) References Cited

U.S. PATENT DOCUMENTS

| 5,898,831 | A | 4/1999 | Hall et al. |
| 6,068,307 | A * | 5/2000 | Murphy ................... 292/302 |
| 6,114,958 | A | 9/2000 | Murphy |
| 6,681,333 | B1 * | 1/2004 | Cho ......................... 713/300 |
| 6,819,557 | B2 * | 11/2004 | Lilenfeld ............... 361/679.56 |
| 6,898,831 | B2 * | 5/2005 | Iwamoto ................. 29/25.35 |
| 2003/0146905 | A1 * | 8/2003 | Pihlaja .................... 345/173 |
| 2005/0162412 | A1 * | 7/2005 | Ronkko et al. .......... 345/179 |
| 2005/0264536 | A1 * | 12/2005 | Kyrola et al. ............ 345/173 |
| 2006/0174139 | A1 * | 8/2006 | Keely et al. ............. 713/300 |
| 2007/0063994 | A1 * | 3/2007 | Carlson et al. .......... 345/179 |

* cited by examiner

*Primary Examiner* — Amare Mengistu
*Assistant Examiner* — Dmitriy Bolotin
(74) *Attorney, Agent, or Firm* — Francis Lammes; Stephen J. Walder, Jr.; Jeffrey S. LaBaw (57) ABSTRACT

Mechanisms are provided for determining the location of a stylus for a portable electronic device. One embodiment provides for determining at a first time that a stylus was not returned to a stylus receiver of the portable electronic device and determining last usage information relating to a last usage of the stylus at a second, earlier time. The embodiment may further include storing by the portable electronic device the determined last usage information and determining stylus location information based on the last usage information. The embodiment may further include providing an indication of the stylus location information to a user. Stylus location information may include one or more of a physical location, a geographic location, a calendar event associated with a last usage, directions to a place of last usage, an application being used at last usage of the stylus, or a user identity.

20 Claims, 4 Drawing Sheets

DETERMINING THE LOCATION OF A STYLUS FOR A PORTABLE ELECTRONIC DEVICE

CROSS-REFERENCES TO RELATED APPLICATIONS

Pursuant to 35 USC §120, this continuation application claims priority to and benefit of U.S. patent application Ser. No. 11/232,740, entitled "SYSTEMS, METHODS, AND MEDIA FOR DETERMINING THE LOCATION OF A STYLUS FOR A PORTABLE ELECTRONIC DEVICE", filed on Sep. 22, 2005, the disclosure of which is incorporated herein in its entirety for all purposes.

FIELD OF INVENTION

The present invention is in the field of portable electronic devices. More particularly, the present invention relates to systems, methods and media for determining the location of a stylus for a portable electronic device.

BACKGROUND

Portable electronic devices such as personal digital assistants (PDAs) or other handheld devices have become ubiquitous as they have decreased in size and cost while increasing in functionality. PDAs and other portable electronic devices allow users to manage vast amounts of information and to perform other tasks. Users can manage their contacts, calendar, e-mail, or other types of information and functions using their PDAs. As PDA technology continues to advance, PDAs are likely to continue to increase in popularity and in functionality. Because of the wide variety of tasks that they can handle and their potential complexity, PDAs often have a stylus, or touch pen, that a user may utilize to input information on a touch screen display. Many users enjoy using a stylus more than other input devices, particularly on PDAs or other handheld devices where buttons, keyboards, and the like are typically too small for comfortable use. Using the stylus and touch screen display, a user can select items on the screen, input written text, or provide other input, by touching the screen at the appropriate location or by writing in a designated area of the screen.

When the stylus is not in use, a user will typically place the stylus in a stylus receiver for safekeeping. The stylus receiver may be a sleeve, channel, or hole typically located within the body of the portable electronic device that will hold and retain the stylus when it is not in use. Accordingly, a user will typically place the stylus in its receiver for safekeeping once they have completed their tasks and use of the PDA. Many people, however, forget to replace their stylus when they are done using it and ultimately misplace their stylus. A user who has lost her stylus may spend valuable time searching for it, resulting in wasted resources and frustration. For many users, attempting to use their PDA without a stylus results in inefficiency as they are not accustomed to using alternative input methods, if any, on the device. In some cases, the user may permanently lose their stylus, requiring them to purchase a replacement unit. While a stylus is not typically very expensive, a user must still face the inconvenience of spending time ordering and/or waiting for a replacement.

A potential solution to problem of losing the stylus for a PDA or other portable electronic device is to provide a detector that determines when a stylus is located in the stylus receiver and to provide an alarm to the user in the event they forget to return the stylus. A user, upon hearing or viewing the alarm, could then place the stylus in its receiver and therefore prevent its misplacement. Such a solution, however, is plagued with a number of problems. First, by the time the detector has determined that the stylus is missing, the user may have already turned off the PDA or left the room, resulting in them missing any alarm. In another example, a user might miss a visual alarm if they were simply turned away from the PDA screen. A hearing-impaired user, in another example, may not hear any audio alarms and thus not be reminded to replace the stylus. The stylus alarm, in its reliance on the attention and ability of the user, does not offer a satisfactory solution to the problem of lost styluses. There is, therefore, a need for an effective mechanism for determining the location of a stylus for a portable electronic device.

SUMMARY

The problems identified above are in large part addressed by systems, methods and media for determining the location of a stylus for a portable electronic device. One embodiment provides a method for determining the location of a stylus for a portable electronic device. One embodiment provides a method in a data processing system for determining at a first time that a stylus was not returned to a stylus receiver of the portable electronic device and determining last usage information relating to a last usage of the stylus at a second, earlier time. The method may further include storing by the portable electronic device the determined last usage information and determining stylus location information based on the last usage information. The method may further include providing an indication of the stylus location information to a user. Stylus location information may include one or more of a physical location, a geographic location, a calendar event associated with a last usage, directions to a place of last usage, an application being used at last usage of the stylus, or a user identity.

Another embodiment provides a machine-accessible medium containing instructions effective, when executing in a data processing system, to cause the system to perform a series of operations for determining the location of a stylus for a portable electronic device. The series of operations generally includes for determining at a first time that a stylus was not returned to a stylus receiver of the portable electronic device and determining last usage information relating to a last usage of the stylus at a second, earlier time. The series of operations may further include storing by the portable electronic device the determined last usage information and determining stylus location information based on the last usage information. The series of operations may further include providing an indication of the stylus location information to a user.

Another embodiment provides a portable electronic device. The system may generally include a stylus detector module to detect whether a stylus is positioned in a stylus receiver of a device body and a stylus usage determiner in communication with the stylus detector module to determine last usage information in the event that the stylus detector module detects that the stylus is not positioned in the stylus receiver. The system may also generally include a stylus location module in communication with the stylus usage determiner to determine stylus location information based on the determined last usage information and a user interface module to provide an indication of the stylus location information to a user.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems, methods and media for determining the location of a stylus for a portable electronic device are disclosed. One embodiment provides a method for determining at a first time that a stylus was not returned to a stylus receiver of the portable electronic device and determining last usage information relating to a last usage of the stylus at a second, earlier time. The method may further include storing by the portable electronic device the determined last usage information and determining stylus location information based on the last usage information. The method may further include providing an indication of the stylus location information to a user. Stylus location information may include one or more of a physical location, a geographic location, a calendar event associated with a last usage, directions to a place of last usage, an application being used at last usage of the stylus, or a user identity.

Using the disclosed system and methodologies, a user may more quickly find a lost stylus after they have misplaced it. By determining last usage information, an indication of what the user was doing or where the user was located when they last used the stylus may be stored. The last usage information, in turn, may be used to determine stylus location information to provide an indication of a likely stylus location to a user. The user, armed with the stylus location information, may then use that information to more easily and quickly find a missing stylus. A user who has lost their stylus and is told, for example, that they last used their stylus while in a department staff meeting (based on a calendar entry or Global Positioning System reading from when and where they last used the stylus) may go back to the department meeting room and likely find their stylus. This may reduce the time and other resources a user would otherwise have to spend to find or replace a lost stylus, potentially resulting in increased productivity and satisfaction. The disclosed system may be particularly useful for users who do not or cannot see or hear an alarm generated by the device when a stylus is not timely replaced.

While specific embodiments will be described below with reference to particular configurations of hardware and/or software, those of skill in the art will realize Chat embodiments of the present invention may advantageously be implemented with other substantially equivalent hardware and/or software systems. Aspects of the invention described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the invention are also encompassed within the scope of the invention.

Figure 1:
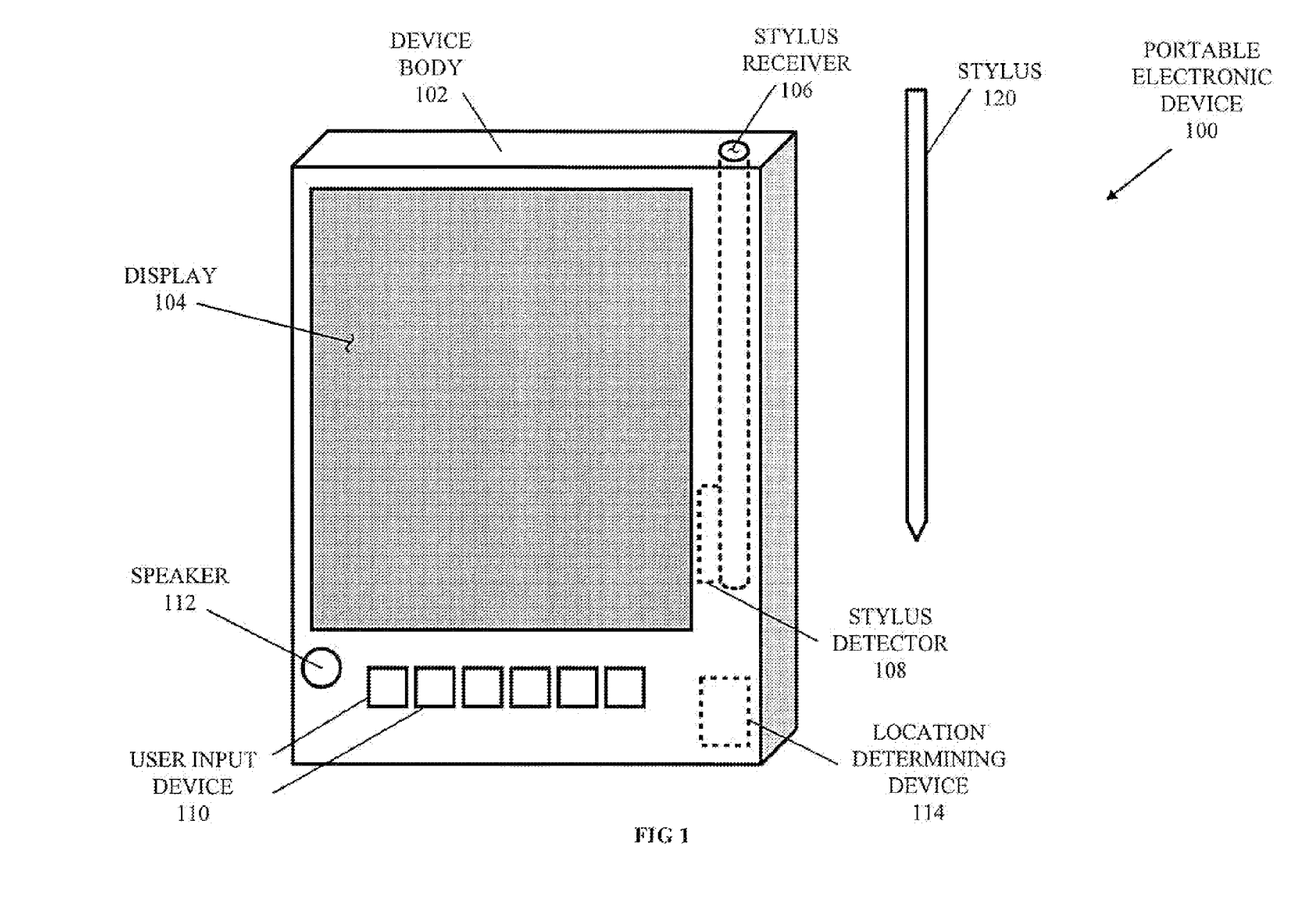
FIG. 1 depicts a portable electronic device with a stylus receiver and stylus detector according to one embodiment.

Turning now to the drawings, FIG. 1 depicts a portable electronic device with a stylus receiver and stylus detector according to one embodiment. The portable electronic device 100 of FIG. 1 includes a device body 102 with a display 104. Portable electronic device 100 may be a personal digital assistant (PDA), calculator, personal planner, palm-top computer, mobile phone, or other handheld or portable computing device. Display 104 (which may be a liquid crystal display (LCD) or other display) may be a touch-screen display to provide output to a user as well as to receive input upon contact with all or part of the display 104. Display 104 may provide a variety of information as output to a user and may include displayed buttons, menus, or other user interface items that a user may select by touching the display 104 at the appropriate location. Display 104 may also include specialized areas, such as an area in which a user can enter alphanumeric characters to "write" on the display. A user may accordingly touch display 104 with a stylus 120 to provide input to the portable electronic device 100. The precise input may depend on where the user touches the display 104 (e.g., selecting a feature on the display, touching in the alphanumeric entry area, etc.), how they touch the display 104 (e.g., at a single point, drawing a letter, etc.), and possibly how hard they touch the display 104.

As described previously, a user may provide input to the portable electronic device 100 using a stylus 120 to touch the display 104. Stylus 120 may be any shape or design and made of any material, and may typically be of a cylindrical design similar in shape to a pencil or pen to be ergonomically desirable to a user. In the depicted embodiment, the portable electronic device 100 includes a stylus receiver 106 for holding the stylus 120 when it is not in use. The stylus receiver 106 may be any size depending on the size and shape of the stylus 120 it holds and the available space inside the portable electronic device 100. In one embodiment, the stylus receiver 106 has a friction latch or other device to hold the stylus 120 in place during handling of the portable electronic device 100. The portable electronic device 100 may also have a stylus detector 108 to detect whether or not the stylus 120 is positioned within the stylus receiver 106. In one embodiment, the stylus detector 108 includes a electrical switch that is closed when the stylus 120 is in the stylus receiver 106, completing a circuit and providing a signal when the stylus 120 is properly stored. In this embodiment, the switch would remain open when no stylus 120 is in the stylus receiver 106, breaking the circuit. One skilled in the art will recognize that other mechanisms for determining, whether a stylus 120 is in the stylus receiver 106 may also be used. For example, the stylus 120 could have a wireless transmitter and the stylus detector 108 a wireless receiver that allows the stylus detector 108 to detect how close the stylus 120 is to the portable electronic device. Other examples may include visual sensors, a light or laser sensor triggered by a stylus 120 when it crosses the light or laser path, or any other technology.

The portable electronic device 100 may also optionally include other input or output devices, such as one or more user input devices 110 or a speaker 112. User input devices 110 may include any type of user input device, such as alphanumeric keys, buttons, levers, or audio input mechanisms such as a microphone. A speaker 112 may be any device which can provide audio output to a user. In an alternative embodiment, a vibratory device (not shown) may be used instead of or in addition to a speaker 112 to alert or provide output to a user.

The portable electronic device 100 may also optionally include a location determining device 114. The location determining device 114 may determine a current location for the portable electronic device 100 and thus the user. The location determining device 210 may be any type of location-determining device such as a Global Positioning System (GPS) receiver or an inertial measurement unit (IMU). A GPS receiver will typically provide coordinates for a present location of the receiver if appropriate GPS satellite coverage exists. The location determining device 114 may also use other wireless methods of location determination beyond GPS, such as signal strength triangulation or by using a last network access point as an approximation of the position. One skilled in the art will recognize that any location-determining methodology may be used by the location determining device 114 to determine or estimate its location at a particular time.

As will be described in more detail subsequently, the portable electronic device 100 of the disclosed embodiments may assist a user in finding a lost stylus 120 in the event that it is not properly returned to the stylus receiver 106. By recording an indication of conditions when the stylus 120 was not returned to the stylus receiver 106 when it likely should have been, the disclosed portable electronic device 100 may provide, based on the saved conditions, an indication of the location of the stylus 120 to a user. A user who has misplaced the stylus 120 may then use the indication of the location of the stylus 120 to find the misplaced item, potentially resulting in savings of time and financial resources.

Figure 2:
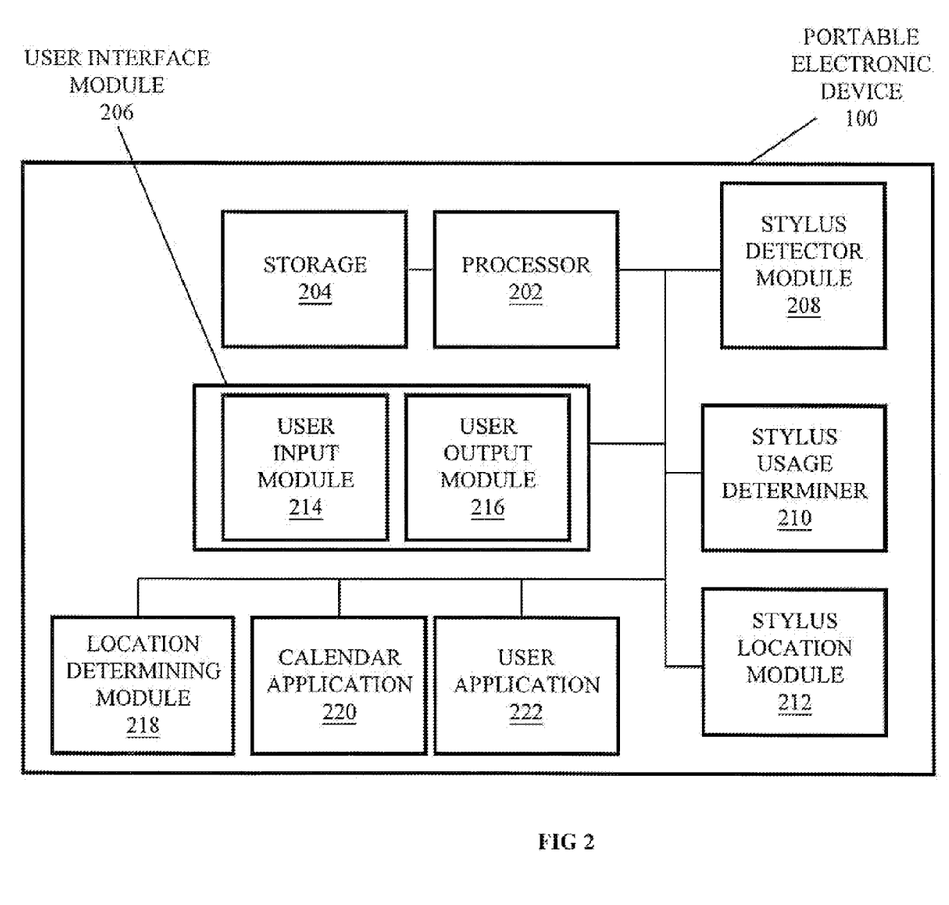
FIG. 2 depicts a block diagram of the portable electronic device of FIG. 1 with a stylus usage determiner and a stylus location support module according to one embodiment.

FIG. 2 depicts a block diagram of the portable electronic device of FIG. 1 with a stylus usage determiner and a stylus location support module according to one embodiment. The portable electronic device 100 of FIG. 1 includes a processor 202, storage 204, a user interface module 206, a stylus detector module 208, a stylus usage determiner 210, and a stylus location support module 212. The components of the portable electronic device 100 of FIG. 1 may be implemented using combinations of hardware, software, and/or firmware. Processor 202 may include one or more processors or threads of processors to execute instructions, such as for other components of the portable electronic device. Storage 204 may include any type of data storage device, such as random access memory (RAM), read only memory (ROM), flash memory, compact disk (CD) or DVD drives, hard drives, and the like. The user interface module 206 may receive user input or provide output to a user, serving as an interface between the user and components of the portable electronic device 100. The user interface module 206 may include a user input module 214 for receiving and processing user input received via touch screen display 104 or any user input devices 110. The user interface module 206 may also include a user output module 216 for providing output to a user, such as via display 104 or a speaker 112.

The stylus detector module 208 may, by interfacing with the stylus detector 108, determine whether or not the stylus 120 is missing from the stylus receiver 106. In one embodiment, the stylus detector module 208 may notify the stylus usage determiner 210 or other component in the event that the stylus detector 108 detects that the stylus 120 is missing from the stylus receiver 106. In other embodiments, the stylus detector module 208 may use more sophisticated methodologies before notifying other components that the stylus 120 is potentially missing. The stylus detector module 208 may, for example, wait a pre-defined (or user defined) time period with the stylus 120 missing before determining that it really is missing. In another example, the stylus detector module 208 may base its determination on other factors in addition to the stylus detector 108, such as whether the user is actively using the portable electronic device 100, whether the portable electronic device 100 is being turned off, etc. The stylus detector module 208 may combine different methodologies as well, such as by determining that the stylus 120 is missing if the stylus 120 is not in the stylus receiver 106 for ten minutes or when the portable electronic device 100 turns off, whichever comes first. The stylus detector module 208 may use any methodology or combination of methodologies to determine that the stylus 120 has likely been misplaced.

The stylus usage determiner 210 may, in one embodiment, determine and store an indication of last usage information. In one embodiment, the stylus usage determiner 210 may determine last usage information in response to a notification from the stylus detector module 208 that the stylus 120 is missing, while in other embodiments the stylus usage determiner 210 may determine the last usage information continually or in some other fashion. Last usage information may be any information which provides an indication of the last usage of stylus 120 with the portable electronic device 100 by the user. Last usage information may include one or more of a time and/or date of the last stylus 120 usage, the physical location or coordinates of the last stylus 120 use, the application of the portable electronic device 100 being used during the last stylus 120 use, the identity of the user (for devices with multiple users), or other types of information. Another example of last usage information may include the identification (i.e., telephone number) of another party to a telephone call and the time of the phone call for a portable electronic device 100 that is a mobile phone. After determining the last usage information, the stylus usage determiner 210 may store the information in storage 204 or another location.

The stylus location module 212 may determine stylus location information based on the last usage information by translating the last usage information, as necessary, to information which a user may use to find & missing stylus 120. Accordingly, stylus location information may be any information which may provide a user an indication of the location of the stylus 120, such as a physical location (e.g., coordinates), a geographical location (e.g., conference room number, city name, building name, street intersection, etc.), directions from a present location, a calendar, entry from the time the stylus 120 was lost (e.g., stylus 120 was lost during dentist appointment, etc.), an application (e.g., stylus 120 was lost while using particular application, etc.), etc.

The stylus location module 212 may interface with other application such as a location determining module 218, a calendar application 220, or a user application 222 in determining stylus location information. The location determining module 218 may use information from the location determining device 114 to determine a location of the portable electronic device 100 at a particular time. If, for example, the last usage information included coordinates of the location where the stylus 120 was last used, the location determining module 212 may convert those coordinates to a format more accessible by a user, such as a city, building, street name, or the like, or may simply use those coordinates. If, on the other hand, the last usage information include a time and date the location determining module 218 may determine stylus location information, based on a saved record of locations from the location determining device 114 or other information. A log of last usage information may be kept in an alternative embodiment. In this embodiment, the log may be reset upon the occurrence of certain conditions, such as the reinsertion of the stylus 120 into the stylus receiver 106.

The stylus location module 212 may interface with an optional calendar application 220 in another embodiment. The calendar application 220 may store records of different meetings or other events based on date and time for a user. The stylus location module 212 may, for example, take last usage information such as a date and time and access a calendar application 220 to determine what the user was scheduled to be doing at the time the stylus 120 was lost. Prompting a user with their activity at the time the stylus 120 was likely lost may help them in quickly finding the stylus 120 or remembering what they did with it. If the stylus location information included an indication that the user was at a dentist appointment when the stylus 120 was lost, they may call or return to that office to easily determine whether it is still there. Similarly, the stylus location information gathered from a calendar application 220 may include a meeting the user attended at that time or other information that may help them find their stylus 120.

The stylus location module 212 may also interface with other user applications 222 to help it determine stylus location information. User applications 222 may include any type of applications. In one embodiment, the identification of the particular user application 222 being used may prove useful to a user in remembering where a stylus 120 was misplaced. If the stylus location information included a reference to an amateur astronomy program the user had been using the night before with the portable electronic device 100, the user may begin their search in their astronomy equipment or in the area in which they had set up their telescope. In other embodiments, specific information from the user application 222 may help the user in finding their stylus 120. A program used by factory employees on PDAs, for example, may record which assembly line they are working on at a particular time (such as by tying the time of entries to the subject matter of entries). A user provided with stylus location information from a user application 222 that told them that the stylus 120 became missing while they were near assembly line-15, for example, could prove useful in finding the stylus 120 as the area of assembly line-15 likely contains the missing stylus 120. In another example, the stylus location module 212 may interface with a mobile phone (such, as via Bluetooth™ or other wireless protocol) to determine the time and identity of a caller from a telephone call at or near the time of last usage. A user could be reminded, for example, that they last used the stylus 120 around the time they talked to their spouse, which they may associate with their ride at home in their car (making their car a likely location for a missing stylus 120). The stylus location module 212 may interface with any type of user application 222 in performing its tasks.

Figure 3:
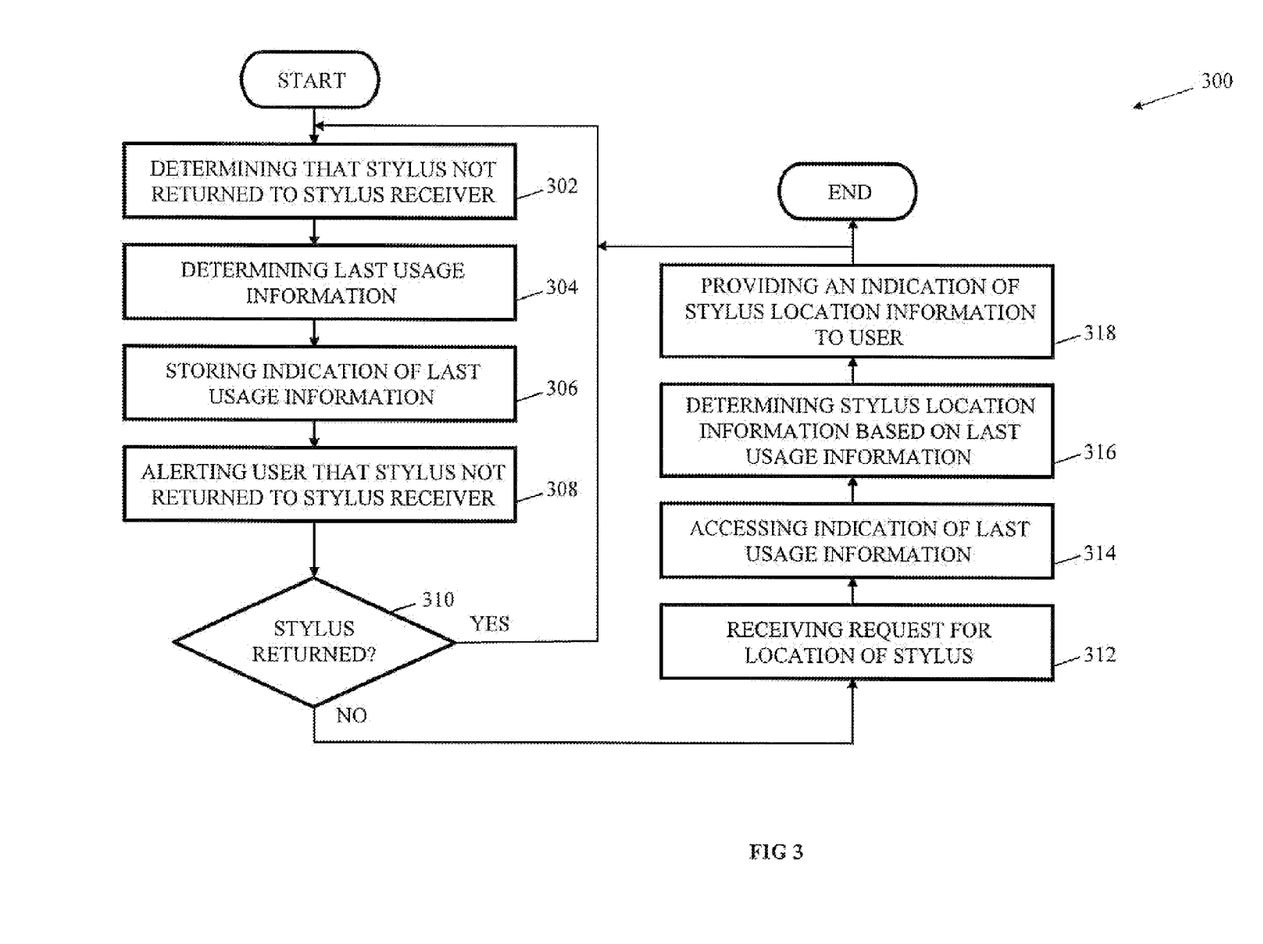
FIG. 3 depicts an example of a flow chart for determining last usage information and providing stylus location information to a user according to one embodiment.

FIG. 3 depicts an example of a flow chart for determining last usage information and providing stylus location information/to a user according to one embodiment. The portable electronic device 100 or any of its components, alone or in combination, may perform the method of flow chart 300. Flow chart 300 begins with element 302, determining that the stylus 120 has not been returned to the stylus receiver 106. In one embodiment, the stylus detector module 208 may determine that the stylus 120 has not been returned to the stylus receiver 106 when it should have based on the stylus detector 108 reading as well as other factors, such as passage of a certain amount of time or user actions such as power cycling the portable electronic device 108 on or off. After determining that the stylus 120 may be missing, the stylus usage determiner 210 may determine last usage information at element 304 and then store an indication of the last usage information at element 306. As described previously, last usage information may be any information which provides an indication of the last usage of stylus 120 by the user. Examples of the use of different types of last usage information are described in relation to FIGS. 4 and 5.

In an alternative embodiment, the stylus detector module 208 may at element 308 alert the user that the stylus 120 was not returned to its receiver 106. The stylus detector module 208 may utilize the speaker 112 or display 104 to attempt to alert the user of the situation. If the user returns the stylus 120 to the stylus receiver 106 (i.e., the stylus detector 108 again detects the stylus 120 at decision block 310), flow chart 300 may return to element 302 to wait until the user fails to place the stylus 120 in the stylus receiver 106 once again. The method of flow chart 300 may also optionally reset any stylus activity log after the stylus 120 is returned. If the user does not return the stylus 120 (such as within a specified period of time), the stylus detector module 208 may determine at decision block 310 to continue to element 312.

Once a user realizes that they have misplaced their stylus 120, they may request stylus location information from the portable electronic device 100. At optional element 312, the user input module 214 of the portable electronic device 100 may receive such a request from a user via a touch screen display 104 or user input device 110. In one embodiment, the user may request an application on the portable electronic device 100 to activate the stylus location module 212 once they realize that their stylus 120 is missing. In some embodiments, the stylus location module 212 may prompt the user if the stylus detector module 208 determines that the stylus 120 is not in the stylus receiver 106 when it should be (i.e., when the portable electronic device 100 is turning on). In an alternative embodiment, the stylus location module 212 may assume that the user would want stylus location information, obviating the need for element 312.

To determine the stylus location information, the stylus location module 212 may first access she stored indication of the last usage information at element 314 and then continue to element 316, where the stylus location module 212 determines the stylus location information based on the last usage information. As described previously, the stylus location module 212 may use different methodologies to determine the stylus location information depending on the nature of the last usage information. After determining the stylus location information, flow chart 300 may continue to element 318, where the user output module 216 may provide an indication of the stylus location information to a user via the display 104, playing the information over a speaker 112, printing the information using a printer, or using any other output device. After providing the stylus location information to the user at element 316, flow chart 300 may either terminate or return to element 302 for further processing.

Figure 4:
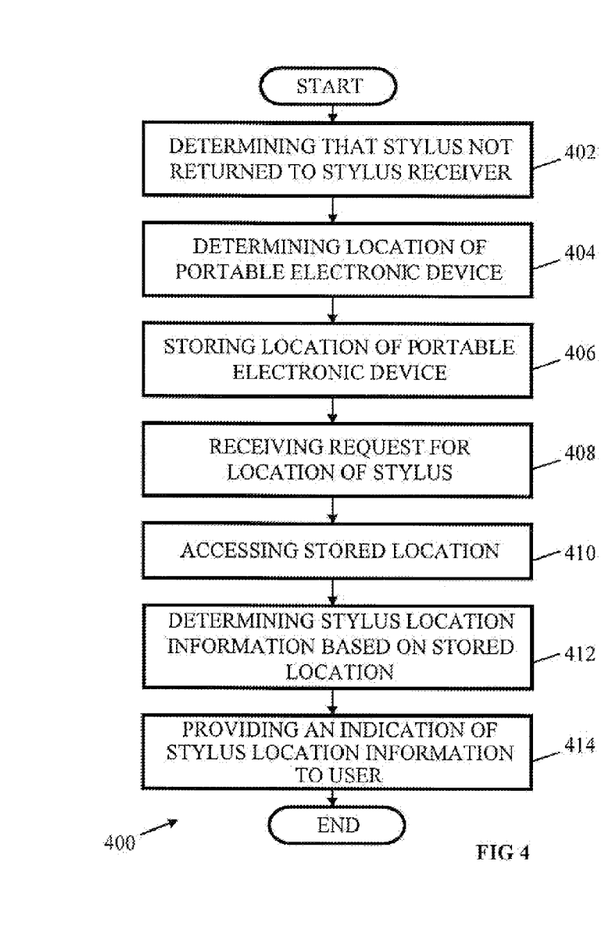
FIG. 4 depicts an example of a flow chart for determining last usage information including a device location and providing stylus location information to a user according to one embodiment.

FIG. 4 depicts an example of a flow chart for determining last usage information including a device location and providing stylus location information to a user according to one embodiment. The portable electronic device 100 or any of its components, alone or in combination, may perform the method of flow chart 400. Flow chart 400 begins with element 402, determining that the stylus 120 has not been returned to the stylus receiver 106. Element 402 may be substantially similar to element 302 of FIG. 3 and the discussion will not be repeated. After determining that the stylus 120 may be missing, the stylus usage determiner 210 may determine last usage information at element 404 by determining the location of the portable electronic device 100 at the time of last usage, such as by receiving location information from the location determining module 218. After determining the location of the portable electronic device 100 at the time of last usage, flow chart 400 may continue to element 406 where the stylus usage determiner 210 may store the location information as last usage information.

Once a user realizes that they have misplaced their stylus 120, they may request stylus location information from the portable electronic device 100. At optional element 408, the user input module 214 of the portable electronic device 100 may receive such a request from a user, as described in relation to element 312. To determine the stylus location information, the stylus location module 212 may next access the stored location information at element 410 and then continue to element 412, where the stylus location module 212 determines the stylus location information based on the stored location information. In one embodiment, the stylus location module 212 may determine that the stylus location information to provide to a user is simply the stored location information relating to the time of last usage. In this embodiment, the stylus location information may be a set of coordinates (e.g., latitude and longitude). In another embodiment, the stylus location module 212 may translate the location information into another format to provide additional benefit to a user. For example, a stylus location module 212 may translate coordinates to a city, a street intersection, an address, a meeting room, a building name, or any other identifier corresponding with the location information. A user may prefer to see that the stylus 120 may have been lost at their home address instead of seeing coordinates for their home, as they may not know the latitude and longitude of their home. After determining the stylus location information, flow chart 400 may continue to element 414, where the user output module 216 may provide an indication of the stylus location information to a user via the display 104, speaker 112, or other output device. In one embodiment, a mapping application may be invoked to identify the location associated with the stylus location information on a map, which may then be displayed to a user. After providing the stylus location information to the user at element 414, flow chart 400 may either terminate or return to element 402 for further processing.

Figure 5:
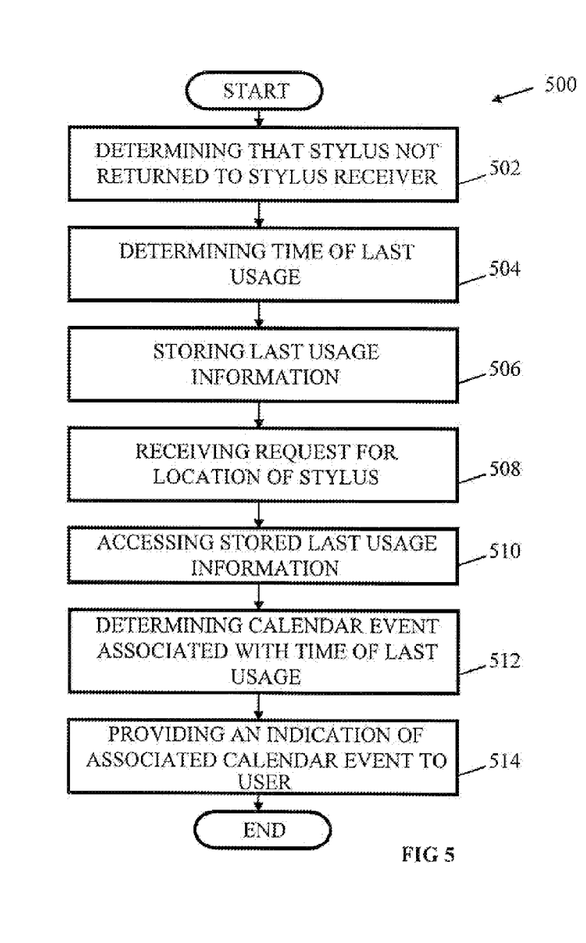
FIG. 5 depicts an example of a flow chart for determining last usage information and providing stylus location information to a user based on a calendar application according to one embodiment.

FIG. 5 depicts an example of a flow chart for determining last usage information and providing stylus location information to a user based on a calendar application according to one embodiment. The portable electronic device 100 or any of its components, alone or in combination, may perform the method of flow chart 500. Flow chart 500 begins with element 502, determining that the stylus 120 has not been returned to the stylus receiver 106. Element 502 may be substantially similar to element 302 of FIG. 3 and the discussion will not be repeated. After determining that the stylus 120 may be missing, the stylus usage determiner 210 may determine last usage information at element 504 by determining the time of last usage of the stylus 120 with the portable electronic device 100, which may be the last time the stylus 120 was used to make an entry before the determination that the stylus 120 was not returned at element 502. After determining the time of last usage, flow chart 500 may continue to element 506 where the stylus usage determiner 210 may store file time as last usage information.

Once a user realizes that they have misplaced their stylus 120, they may request stylus location information from the portable electronic device 100. At optional element 508, the user input module 214 of the portable electronic device 100 may receive such a request from a user, as described in relation to element 312. To determine the stylus location information, the stylus location module 212 may next access the stored location information at element 510 and then continue to element 512, where the stylus location module 212 determines the stylus location information based on the stored time of last usage. In one embodiment, the stylus location module 212 may access a calendar application 220 that has information regarding the user's schedule. The stylus location module 212 may match the time of last usage with entries in the calendar application 220 to determine what the user had scheduled for the time of last usage. If the user had a status meeting scheduled in the department conference, for example, at the time of last usage, the time and place of that meeting may be considered the stylus location information. A user receiving this stylus information may look for a missing stylus 120 in the department meeting room, potentially saving time. Even if the calendar application 220 did not have location information within it, an identification of a meeting name may still prove useful to a user looking for a lost stylus 120.

After determining the stylus location information, flow chart 500 may continue to element 514, where the user output module 216 may provide an indication of the stylus location information to a user via the display 104, speaker 112, or other output device. After providing the stylus location information to the user at element 514, flow chart 500 may either terminate or return to element 502 for further processing.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for determining the location of a stylus for a portable electronic device. It is understood that the form of the invention shown and described in the detailed description and the drawings are to be taken merely as examples. It is intended that the following claims be interpreted broadly to embrace all the variations of the example embodiments disclosed.

What is claimed is:

1. A method in a data processing system for determining the location of a stylus for a portable electronic device, the method comprising:

determining by the portable electronic device at a first time that a stylus was not returned to a stylus receiver of the portable electronic device;

determining by the portable electronic device last usage information relating to a last usage of the stylus at a second time, the second time being earlier than the first time;

storing by the portable electronic device the determined last usage information;

determining by the portable electronic device stylus location information based on the last usage information;

providing by the portable electronic device an indication of the stylus location information to a user.

2. The method of claim 1, further comprising after determining that the stylus was not returned to the stylus receiver, alerting by the portable electronic device the user that the stylus was not returned to the stylus receiver.

3. The method of claim 1, further comprising before determining the stylus location information, accessing by the portable electronic device the stored last usage information.

4. The method of claim 1, further comprising before determining the stylus location information, receiving by the portable electronic device a request for a location for the stylus.

5. The method of claim 1, wherein determining that the stylus was not returned to the stylus receiver comprises determining that a stylus detector did not detect a stylus for a specified period of time.

6. The method of claim 1, wherein determining that the stylus was not returned to the stylus receiver comprises determining that a stylus detector did not detect a stylus while the portable electronic device is being power cycled.

7. The method of claim 1, wherein the last usage information comprises one or more of physical coordinates, a time of last usage, a date of last usage, an application being used at last usage, a telephone number associated with a call, or an identity of the user.

8. The method of claim 1, wherein the stylus location information comprises one or more of a physical location, a geographic location, a calendar event associated with a last usage, directions to a place of last usage, an application being used at last usage, or an identity of the user.

9. The method of claim 1, wherein providing an indication of the stylus location information to the user comprises one or more of displaying the stylus location information to the user, playing the stylus location information over a speaker, displaying a location associated with the stylus location on a map, or printing the stylus location information.

10. A non-transitory machine-accessible medium containing instructions effective, when executing in a data processing system, to cause said data processing system to perform operations comprising:

determining by the portable electronic device at a first time that a stylus was not returned to a stylus receiver of the portable electronic device;

determining by the portable electronic device last usage information relating to a last usage of the stylus at a second time, the second time being earlier than the first time;

storing by the portable electronic device the determined last usage information;

determining by the portable electronic device stylus location information based on the last usage information;

providing by the portable electronic device an indication of the stylus location information to a user.

11. The machine-accessible medium of claim 10, further comprising before determining the stylus location information, accessing by the portable electronic device the stored last usage information.

12. The machine-accessible medium of claim 10, further comprising before determining the stylus location information, receiving by the portable electronic device a request for a location for the stylus.

13. The machine-accessible medium of claim 10, wherein the last usage information comprises one or more of physical coordinates, a time of last usage, a date of last usage, an application being used at last usage, a telephone number associated with a call, or an identity of the user.

14. The machine-accessible medium of claim 10, wherein the stylus location information comprises one or more of a physical location, a geographic location, a calendar event, directions to a place of last usage, an application being used at last usage, or an identity of the user.

15. The machine-accessible medium of claim 10, wherein providing an indication of the stylus location information to the user comprises one or more of displaying the stylus location information to the user, playing the stylus location information over a speaker, displaying a location associated with the stylus location on a map, or printing the stylus location information.

16. A portable electronic device system, the system comprising:

a stylus detector module, the stylus detector module being adapted to detect whether a stylus is positioned in a stylus receiver of a device body;

a stylus usage determiner in communication with the stylus detector module, the stylus usage determiner being adapted to determine last usage information in the event that the stylus detector module detects that the stylus is not positioned in the stylus receiver;

a stylus location module in communication with the stylus usage determiner, the stylus location module being adapted to determine stylus location information based on the determined last usage information; and a user interface module in communication with the stylus location support module, the user interface module being adapted to provide an indication of the stylus location information to a user.

17. The system of claim 16, further comprising a location determining module in communication to determine a location of the portable electronic device, wherein the last usage information is the determined location at a time of last usage.

18. The system of claim 16, further comprising a calendar application having a plurality of calendar entries, wherein the last usage information is a calendar entry associated with a time of last usage.

19. The system of claim 16, wherein the last usage information comprises one or more of physical coordinates, a time of last usage, a date of last usage, an application being used at last usage, a telephone number associated with a call, or an identity of the user.

20. The system of claim 16, wherein the stylus location information comprises one or more of a physical location, a geographic location, a calendar event, directions to a place of last usage, an application being used at last usage, or an identity of the user.

* * * * *